(12) United States Patent
Abuhamdeh

(10) Patent No.: US 7,783,326 B2
(45) Date of Patent: Aug. 24, 2010

(54) REMOTE RECHARGEABLE PREPAID CELLULAR SERVICE PERIPHERAL DEVICE

(76) Inventor: Maher Abuhamdeh, 2482 Dos Rios Dr., San Ramon, CA (US) 94583

( * ) Notice: Subject to any disclaimer, the term of this patent is extended or adjusted under 35 U.S.C. 154(b) by 0 days.

(21) Appl. No.: 12/250,444

(22) Filed: Oct. 13, 2008

(65) Prior Publication Data

US 2009/0037331 A1 Feb. 5, 2009

Related U.S. Application Data

(60) Division of application No. 10/859,862, filed on Jun. 3, 2004, now Pat. No. 7,454,232, which is a continuation of application No. 10/313,803, filed on Dec. 6, 2002, now abandoned, which is a continuation of application No. 09/502,866, filed on Feb. 11, 2000, now abandoned.

(51) Int. Cl.
H04B 1/38 (2006.01)

(52) U.S. Cl. .......... 455/558; 455/405; 705/41; 705/14; 705/34; 705/35; 705/10
(58) Field of Classification Search ......... 455/558, 455/405; 705/41, 14, 34, 35, 10
See application file for complete search history.

(56) References Cited

U.S. PATENT DOCUMENTS

| 6,016,476 | A | * | 1/2000 | Maes et al. ............. 705/1 |
| 6,142,369 | A | * | 11/2000 | Jonstromer ........... 235/380 |
| 6,301,472 | B1 | * | 10/2001 | Nakasu et al. ......... 455/405 |

* cited by examiner

*Primary Examiner*—David Q Nguyen
(74) *Attorney, Agent, or Firm*—Fliesler Meyer LLP

(57) ABSTRACT

An integrated prepaid cellular service and telephone unit including a cellular transceiver, a storage unit, a processor; and a credit/debit card interface. In a further aspect, the invention includes code for contacting a cellular provider, transmitting user debit/credit information, receiving a quantity of pre-paid cellular service units, storing the units, and allowing use of the cellular transceiver as long as said units does not equal zero.

8 Claims, 3 Drawing Sheets

REMOTE RECHARGEABLE PREPAID CELLULAR SERVICE PERIPHERAL DEVICE

CLAIM OF PRIORITY

This application is a divisional of application Ser. No. 10/859,862, filed Jun. 3, 2004, now U.S. Pat. No. 7,454,232, issued Nov. 18, 2008, which is a continuation of application Ser. No. 10/313,803, filed Dec. 6, 2002, abandoned, which is a continuation of application Ser. No. 09/502,866, filed Feb. 11, 2000, abandoned.

BACKGROUND OF THE INVENTION

1. Field of the Invention

The invention relates to wireless transactions using wireless peripheral devices, and specifically to a wireless telephone serving as a point of sale for debit transactions.

2. Description of the Related Art

Wireless communication technology has allowed individuals considerable freedom in how and when they communicate. Analog signal-based cellular telephone technology, which allows people to travel freely while always having access to a telephone, has grown and developed into digital-based systems and hybrid telephone/multifunction devices so that a number of functions are now provided in a single integrated device. For example, it is not uncommon to provide advanced contract information in combination with wireless telephone technology, as evidenced by Qualcomm's pdQ™ Smartphone and Motorola's Startac™ Clipon Organizer.

In addition, wireless phones themselves have become much more sophisticated, incorporating the use of so called smart cards, which allow for increased functionality in wireless devices. Such cards can store electronic money and user credit/debit information, within a developing industry standard for electronic data interchange (EDI) transactions. There are two basic kinds of smart cards. An "intelligent" smart card contains a central processing unit—a CPU—that actually has the ability to store and secure information, and "make decisions," as required by the card issuer's specific applications needs. Because intelligent cards offer a "read/write" capability, new information can be added and processed. For example, monetary value can be added and decremented as a particular application might require.

The second type of card is often called a memory card. Memory cards can contain many forms of information, including stored value which the user can "spend" in a pay phone, retail, vending or related transaction. Such cards come in both "contactless" form, which are read by readers when such cards are in the proximity of the reader, and cards adapted for electrical coupling to specific adapters, such as those found in many newer cellular phones.

Beyond merely producing a wireless device, the wireless service provider faces the challenge of ensuring the revenue stream from it's constituents. There are a number of means of access to the service component of wireless technology. Traditionally, for example, when one wants a cellular telephone, one enters into a service contract with a cellular provider either with the provider directly or with a retailer, and the hardware is configured to work through the service. Typically, the user uses the phone at will and simply pays a monthly cost computed by the service provider. However, there are other service options.

One option to the traditional account maintenance option is so called "pre-paid" cellular service. Those users who have dubious credit ratings, or, for example, corporations who seek to control the cost of a number of individual phones, pre- purchase cellular service from a particular provider for a particular phone and access to the cellular service is typically cut off once the pre-paid amount of the service is used up.

Renewing prepaid service time is somewhat inconvenient. The user must return to the retail establishment to provide cash or credit information, and the service is recharged by the establishment. Typically, the service provider tracks usage information and the amount of prepayment entirely at the service end, using the cellular phone identification to record time used and remaining.

Hence, it is generally inconvenient to renew prepaid cellular phone service once such service has expired. As such, the popularity of such service is limited.

One pre-paid system currently in use is the Philips ISIS telephone, which allows the use of a prepaid calling card for use with wireless telephone service. However, while this allows for a pay-per-call service, once the calling cards are depleted, the customer must go to a retail location and purchase new calling cards. Further, the card numbers must be entered the first time a call is made with a new card when making a call. Further, the customer must pay for air time while the phone accesses the off-line calling card account and air time costs with this system is very high. A further disadvantage with this system is the fact that customers cannot roam into different systems, as the calling card value is housed in a system localized database.

SUMMARY OF THE INVENTION

In one aspect, the invention, roughly described, comprises an integrated prepaid cellular service and telephone unit including a cellular transceiver, a storage unit, a processor; and a credit/debit card interface. In a further aspect, the invention includes code for contacting a cellular provider, transmitting user debit/credit information, receiving a quantity of pre-paid cellular service units, storing the units, and allowing use of the cellular transceiver as long as said units does not equal zero.

The invention allows for remote purchase and updating of pre-paid wireless services via the transceiver unit, without requiring the user to return to the cellular point of sale to recharge prepaid air time. In further embodiments, the invention may serve as a wireless point of sale device.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

The present invention comprises a system which enables prepaid wireless service to be easily distributed to a wireless device. The wireless device of the present invention will include components which allow it to track the prepayment of services within the device, thereby enabling the device to be utilized in any number of different regions, and reducing the delay of service presently seen with prepaid wireless services.

In addition, the device of the present invention can serve as a point of sale device by allowing electronic funds to be collected and/or maintained in the wireless unit itself.

Figure 1:
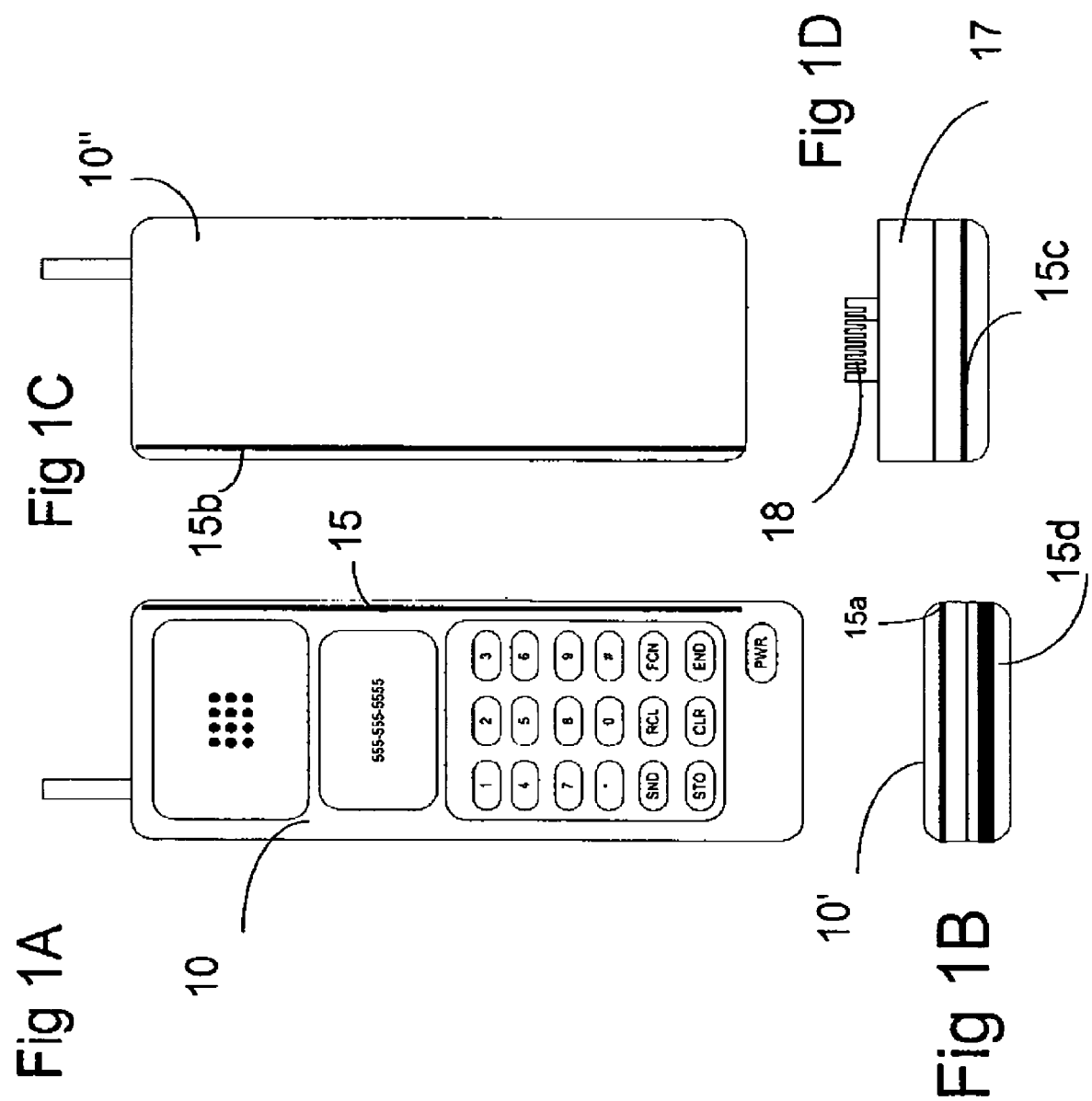
FIGS. 1A-1D are plan views of wireless peripheral devices formed in accordance with the present invention.

FIG. 1 shows an exemplary wireless unit such as a cellular phone which may be formed in accordance with the present invention. FIG. 1A is a plan view of an exemplary cellular phone 10 which includes a magnetic card reading slot on one side of the phone and a smart/SIM card reading slot on the bottom portion of the phone in 15d. It should be recognized that such technology is readily available as such magnetic strip readers are used currently in, for example, GTE Corporation Airfone® units on major aircraft carriers in the United States and abroad. FIG. 1B is a bottom view of the peripheral device of the present invention showing the magnetic card reader 15a located on the bottom portion of the phone, and a smart card reader 15d. FIG. 1C is a view of the phone of the present invention wherein the magnetic card reader 15b is shown on the back portion of the phone, and a smart card reader slot shown on the bottom portion of cell phone 15d. FIG. 1D is a view of a separate attachable card reader 17 which may include a connector 18, adapted to couple to the phone's connection plug.

While FIGS. 1A-1D show one alternative for using the peripheral device 10 as a point-of-sale device, it should be recognized that phones which are adapted to use standard format, insertable smart cards such as those developed by Motorola may be likewise used in implementing the system of the present invention, discussed below. In such cases, funds need not be transferred from a magnetic strip card, but may be transferred to the card by a conventional means and funds transferred from the card in accordance with the following process without the necessity of using a separate debit/credit card.

Figure 2:
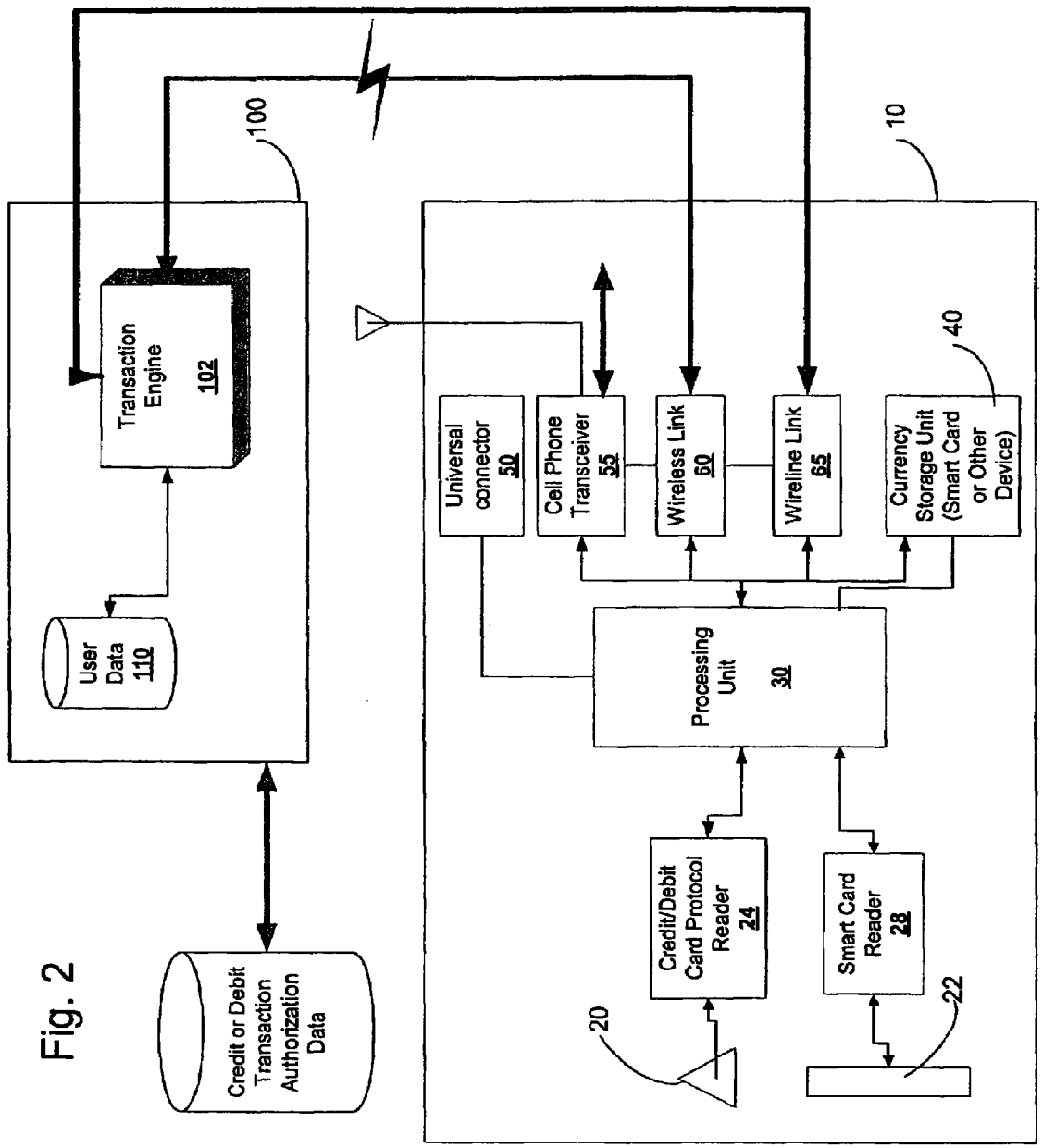
FIG. 2 is a block diagram representing the functional components of the hardware of a peripheral formed in accordance with the present invention.

FIG. 2 shows a block diagram of the functional units incorporated into the peripheral device 10 of the present invention. For purposes of this explanation, the peripheral device 10 will be assumed to be a cellular phone, and the service provided will be exemplified as prepaid cellular. However, it should be recognized that the peripheral device may be any number of combinations of cellular units of other devices, or other types of wireless technology beyond cellular, while still falling within the scope and content of the present invention.

As shown in FIG. 2, each cellular phone 10 requires a user debit/credit information interface which, in the embodiment shown in FIG. 2, comprises a magnetic stripe reader 20 and a smart card interface 22. The magnetic interface 20 is electrically coupled to a credit/debit card protocol reader 24 which operates in accordance with well-known techniques. Likewise, the smart card interface 22, which may generally comprise an electrical contact coupling suitable to connect to one or more card types, is coupled to a smart card reading interface 28. Both the protocol reader 24 and the smart card reader 28 are coupled to a microprocessing unit 30. Cell phone 10 includes a memory storage area 40 which may in one embodiment comprise a portion of the smart card, or may be integrated into phone 10. The processing unit couples to a universal cable connector 50, the cell phone transceiver 55, another wireless link 60, such as an infrared port or a wireline link 65 via either traditional phone line or through a computer, to enable transmission to a back-end service 100. In essence, the processing unit can direct a cell phone transceiver 55 to contact via a wireless link the back-end unit 100 to authorize a pay-per-call service in accordance with the present invention. Back-end 100 includes a transaction engine 102 which may couple to specific user data 110 which has been identified by a previous input to the back-end system 100. Back-end system 100 will then couple to credit or debit transaction authorization data 110 at the user's bank or credit service information bureau to authorize transactions based on input received at the interface 20 or 22.

Figure 3:
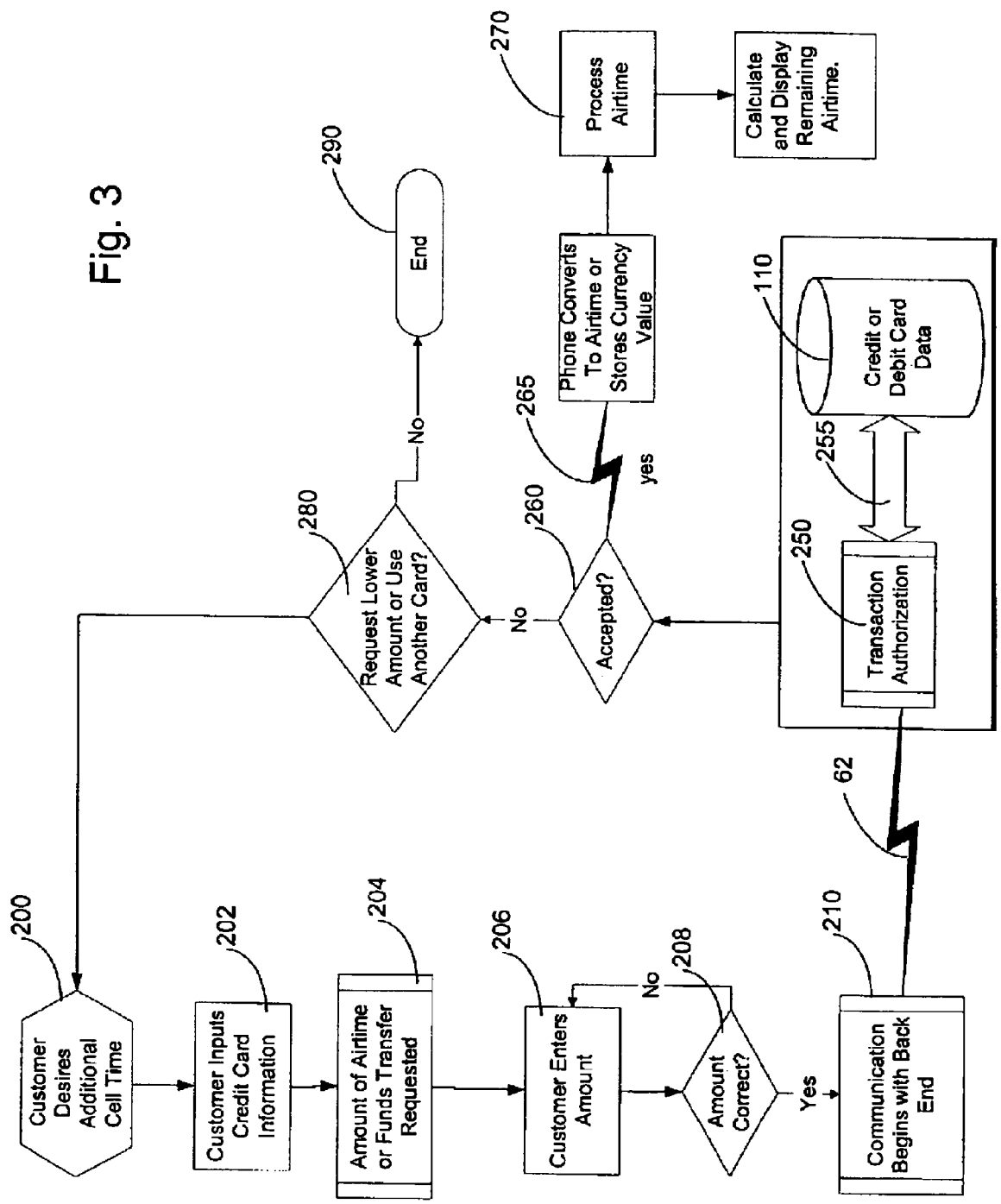
FIG. 3 is a flowchart representing a transactional flow for a user of the system of the present invention.

FIG. 3 shows how the components shown in FIG. 2 operate in an exemplary process phone in accordance with the present invention. At step 200 a customer who desires additional cell time will, at step 202, input credit card or other financial information into the peripheral device 10. This may comprise swiping a magnetic card via an interface in a phone 10-10", or may comprise passing a suitable transaction to move funds stored in the smart card to the transaction. At step 204, the customer will input the amount of air time or the amount of money which is desired to be transferred into the phone and will enter this amount at step 206. At step 208, the phone will verify whether the amount entered is correct and if not, the customer will be asked to re-input the amount at step 206 again. If the amount is correct, at step 210, the phone will begin communication with the back-end service via the cell phone transceiver 55 or wireless, wireline, or PC link 60. At step 250, transaction authorization takes place by use of an interchange 255 with the credit or debit card data base 110. If the authorization is accepted at step 260, at step 265 a signal will return to the peripheral unit 10 via the transceiver or other wireless, wireline or PC link to allow the phone to authorize usage of the air time based on the prepaid value input, or transfer financial data into the phone as per the requested service. The air time is processed at step 270 and the phone will calculate and display the remaining air time or current currency value stored in the phone. If the transaction is not authorized at step 280, the user may be offered the option of requesting a lower amount or using a different credit or debit card. If the user refuses, the process ends at step 290. If the user desires to begin a new process, the process returns to loop 200 as the customer is allowed to begin the process again.

Unlike prior methods, the peripheral device of the present invention uses a chip card inserted into a cell phone, which may be in the form of a full-size smart card, a miniature smart card, and hardware circuit, or a software circuit to pay for calls. This provides a new method of payment for pre-paying cellular phone service. This allows the phone to contain the monetary value or calling authorization within the phone itself. In addition, it allows the phone to act as a point-of-sale device for wireless transactions, since the chip can contain electronic money to complete financial transactions.

The peripheral device of the present invention can use three types of hardware in accordance with the present invention. A full-size, credit card-type smart card may be utilized, the smaller size chip-type smart card may be utilized, or hardware may be embedded into the phone to store the data and house the functional block shown in FIG. 2. One advantage of using the full size credit card-style smart card is that the smart card may be removed from the phone to support retail purchases or to add monetary value to the card from external terminals linked to banks. In this case, the phone may also act as a remote terminal for adding monetary value to the card. In the case of miniature SIM-type smart cards, a chip may also be removed and updated from terminals.

Alternatively, when using a magnetic strip reader as the credit/debit interface, the phone simply reads account information embedded into a magnetic strip from the card. The information from the credit or debit card can be stored in the phone's memory.

Information needed to access external financial databases to transfer monetary value or calling authorization can be entered by the customer into the keypad on the phone. In such cases, the system contemplates the use of the invention without a magnetic card interface where the phone can store the credit card after the initial entry.

The system provides a novel method of authorizing prepaid wireless peripheral services to a peripheral device. In particular, this will find specific advantages in the prepaid cellular phone market. The system of the present invention will combine the convenience of traditional cell phones with the advantages of prepaid cellular service. In particular, no calling card numbers need to be re-entered or remembered, there is no waiting for verification or updates, and no need to replace calling cards when the financial balance is expired. Furthermore, unlike with most cellular services, there is no contract or credit check. Furthermore, there is no security deposit if the customer has a poor credit rating.

In a particular advantage, the phone can also serve as a wireless point-of-sale terminal, and a mobile terminal for adding monetary value "on air" to the chip memory supported in its internal systems. In addition, the system will allow for unrestricted roaming of the peripheral device between different service regions.

The many features and advantages of the present invention will be apparent to one of average skill in the art. All such features and advantages are intended to be within the scope of this description as defined by this application and the following claims.

What is claimed is:

1. A mobile wireless cellular telephone, comprising:
   a) internal data storage memory for storing data representing electronic money and data representing credit/debit card information to enable a user to perform financial transactions within the telephone;
   b) a transceiver for transferring the data representing electronic money from and into the telephone;
   c) executable program instructions stored in the telephone; and
   d) a processor, responsive to said executable program instructions, for accessing said internal data storage memory to transfer the data representing electronic money into and out of the telephone via said transceiver, wherein said processor is responsive to said executable program instructions to enable the telephone to access an external server to transfer the data representing electronic money from the telephone to the server, to receive the data representing electronic money from the server into the telephone, and to cause the server to transfer the data representing electronic money to other external wireless cellular telephones.

2. A mobile wireless cellular telephone according to claim 1, wherein said processor is responsive to said executable program instructions to enable the telephone to receive via said transceiver, and to store in said internal data storage memory, a unique electronic ID of an external retail financial transaction device, and to transmit the stored electronic ID via said transceiver to the server.

3. A mobile wireless cellular telephone according to claim 2, wherein said processor is responsive to said executable program instructions to enable the telephone to transmit via said transceiver information instructing the server to transfer the data representing electronic money to the financial transaction device corresponding to said unique electronic ID.

4. A mobile wireless cellular telephone according to claim 1, wherein said executable program instructions enable a user to purchase and pay for goods and services using said credit/debit card information or the electronic money represented by the data.

5. A mobile wireless cellular telephone according to claim 1, further comprising an attachment device storing customer and account information enabling the telephone to read said customer and account information.

6. A mobile wireless cellular telephone according to claim 5, further including executable program instructions to require a user ID to be entered to authenticate the user.

7. A storage medium which stores computer instructions for execution by a processor and for access to an internal memory by the processor in a mobile wireless cellular telephone, that when executed by the processor enable the cellular telephone to:
   receive and store user information in the internal memory;
   receive a request for electronic money;
   communicate with a server external to the cellular telephone to transmit the user information and the request after receiving the user financial information and the request;
   automatically transmit the user financial information and the request to the server;
   receive data representing the requested electronic money from the server into the telephone;
   transfer data representing electronic money from the telephone to the server; and
   cause the server to transfer data representing electronic money to other external wireless cellular telephones.

8. A storage medium according to the claim 7 wherein the instructions further enable the processor to store data representing the electronic money on the internal memory.

* * * * *